(12) United States Patent
Miura et al.

(10) Patent No.: US 6,679,428 B2
(45) Date of Patent: Jan. 20, 2004

(54) CARRIER CASE AND A METHOD OF READING INFORMATION OF A DATA CARRIER

(75) Inventors: Masaya Miura, Matsudo (JP); Yutaka Miyazaki, Sakura (JP); Mitsuo Usami, Tachikawa (JP); Takashi Yoshida, Higashiibaragi (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 09/784,123

(22) Filed: Feb. 16, 2001

(65) Prior Publication Data

US 2001/0026220 A1 Oct. 4, 2001

(30) Foreign Application Priority Data

Mar. 31, 2000 (JP) .................................... 2000-101210

(51) Int. Cl.$^7$ ................................................. G06K 7/08
(52) U.S. Cl. ..................... 235/451; 235/435; 235/440; 235/449
(58) Field of Search ................ 235/451, 435, 235/440, 449; 209/584, 900

(56) References Cited

U.S. PATENT DOCUMENTS 3,679,876 A * 7/1972 Faith et al. ................. 235/435
4,844,438 A * 7/1989 Mistyurik et al. ........... 271/181
5,119,954 A * 6/1992 Svyatsky et al. ............ 209/584
6,236,009 B1 * 5/2001 Emigh et al. ............... 209/584

FOREIGN PATENT DOCUMENTS

GB          22743763 A   *  7/1994  .............. G06K/7/00

* cited by examiner

*Primary Examiner*—Michael G. Lee
*Assistant Examiner*—Seung H Lee
(74) *Attorney, Agent, or Firm*—Antonelli, Terry, Stout & Kraus, LLP

(57) ABSTRACT

A carrier case for accommodating paper sheets, cards or the like having radio frequency data carriers attached thereto or watermarked therein. A device is provided for reading out information from the radio frequency data carriers while eliminating the need for externally removing the paper sheets, cards or the like having the radio frequency data carriers attached thereto or watermarked therein. The carrier case is provided therein with an opening for insertion of the data reading device, and is also provided with a movable divider plate. When it is desired to read out data from the radio frequency data carriers, the divider plate is tilted so that the data reading device can read out the data from the data carriers with a good sensitivity in a relationship contacted with the radio frequency data carriers or not contacted therewith.

4 Claims, 7 Drawing Sheets

CARRIER CASE AND A METHOD OF READING INFORMATION OF A DATA CARRIER

BACKGROUND OF THE INVENTION

The present invention relates to a processing method for accurately reading out data from radio frequency identifications (RFIDs) or radio frequency data carriers attached to cards, paper sheets, etc., counting their serial numbers and collating them and more particular, to a carrier case as a data reader for accurately reading out data from the radio frequency data carriers.

Conventionally, product management has been carried out using bar code, but it has been insufficient from the viewpoint of its identification ability and information storage amount. To avoid this, there has been well known a system for storing information about objects to be managed and using radio frequency data carriers attachable to the objects.

Under a condition that a plurality of paper sheets, cards or the like having radio frequency data carriers attached thereto or watermarked therein are stacked, however, the prior art has had a limit in the possible number of such sheets or cards to be accurately readable out due to interference, etc. of electromagnetic waves.

SUMMARY OF THE INVENTION

The present invention is directed to an apparatus in which paper sheets, cards or the like having radio frequency data carriers attached thereto or watermarked therein are accommodated in a carrier case so that data can be accurately read out from the radio frequency data carriers of the sheets or cards while eliminating the need for externally removing the sheets or cards from the carrier case. The term "watermark" as used herein means to bury a data carrier in a piece of sheet or card. An object of the present invention is to provide a method for remarkably reducing the number of steps necessary for counting and collating operations in the prior art.

In accordance with the present invention, there is provided a carrier case which can accommodate paper sheets, cards or the like having data carriers attached thereto and which can have a data memory means and a data communication means. The carrier case is provided therein with an opening for insertion of a device for reading out data from the data carriers, provided with a device for reading out the data from the data carriers, and provided with a means for reading out the data from the data carriers in a contacted or non-contacted manner. Provided within the carrier case is a movable divider plate. When it is desired to accommodate paper sheets having radio frequency data carriers attached thereto in the carrier case, a means is provided for setting the divider plates in their vertical state to smoothly accommodate the sheets in the carrier case. For the purpose of reading out the data from the radio frequency data carriers, the reading device has a means for moving the divider plate obliquely at an arbitrary angle in such a manner as to be able to read out the data from the radio frequency data carriers on a contacted or non-contacted basis.

DESCRIPTION OF THE EMBODIMENTS

The present invention will be explained in connection with its embodiments with reference to accompanying drawings.

Figure 1:
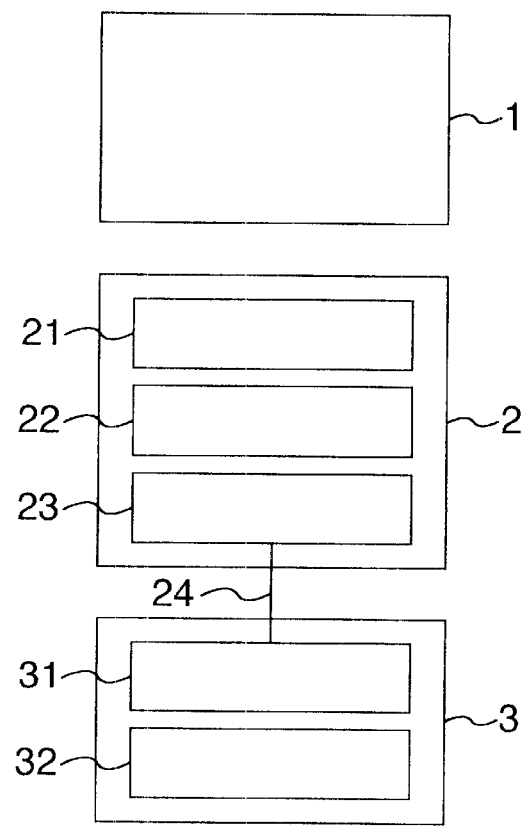
FIG. 1 shows an arrangement of an embodiment of a radio frequency data carrier system in accordance with the present invention.
Figure 2:
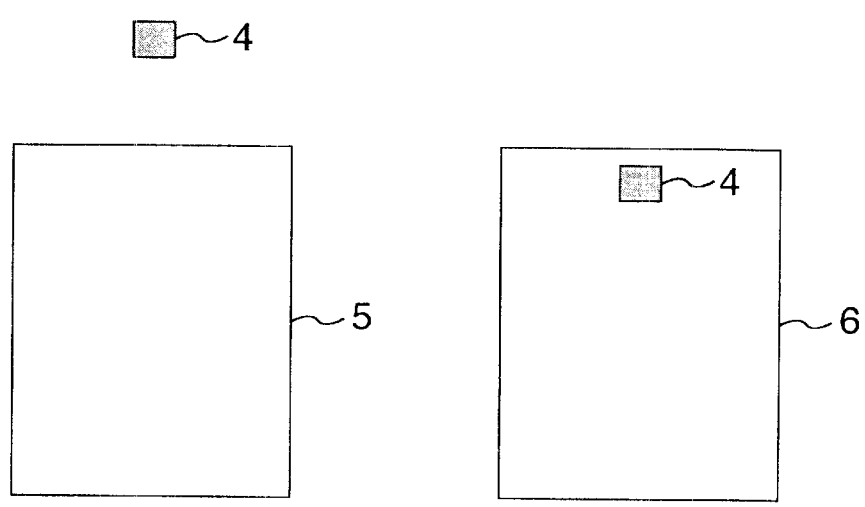
FIG. 2 shows a radio frequency data carrier, a paper sheet having the radio frequency data carrier attached thereto or watermarked therein, and a state of the sheet having the sheet attached thereto or watermarked therein in the present invention.
Figure 16:
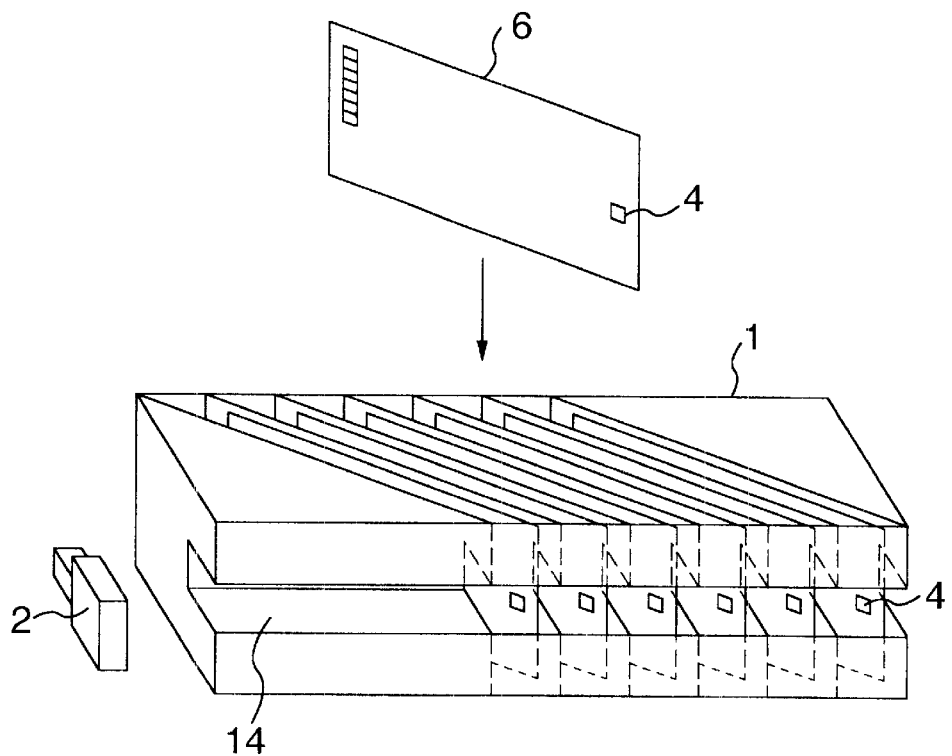
FIG. 16 is a perspective view of a carrier case in the present invention.

FIG. 1 shows an arrangement of a radio frequency data carrier system in accordance with the present invention. The illustrated arrangement includes a carrier case 1, a projector 12 for putting such a sheet of paper or card 6 having a radio frequency data carrier 4 attached thereto as shown in FIG. 2 into the carrier case 1, a divider/rotary plate 13 tilted at an arbitrary angle, and a groove 14 provided in the carrier case for passage of a device 2 for reading out information written in data storages of the radio frequency data carriers 4 as shown in FIG. 16. Reference numeral 21 denotes a reader of the reading device 2, numeral 22 denotes a data storage thereof, and 23 denotes a communication part thereof.

Numeral 24 denotes a communication path for communication between the communication part 23 and an information processor 3.

The information processor 3 has a communication part 31 and an information processing part 32.

FIG. 2 shows a radio frequency data carrier and a sheet of paper or a card. Numeral 4 denotes a radio frequency data carrier, 5 denotes a sheet of paper or a card, and 6 denotes a sheet of paper or a card having the radio frequency data carrier 4 attached thereto.

Figure 3:
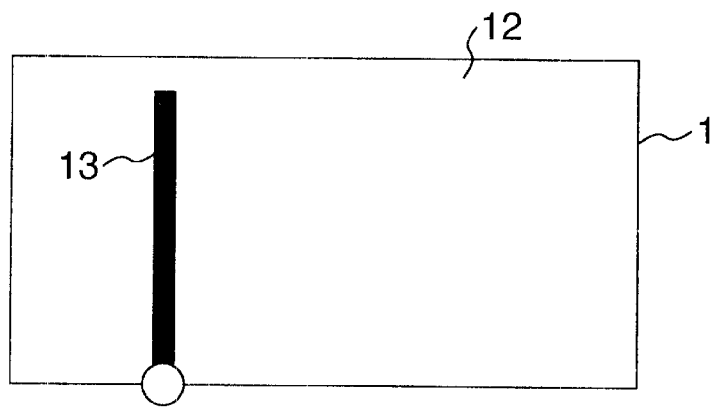
FIG. 3 schematically shows a carrier case in the present invention, with sheets or the like not provided in the carrier case.

FIG. 3 shows a carrier case 1 and a divider/rotary plate 13 tilted at an arbitrary angle. In the illustrated example, an opening is provided in an upper part of the carrier case 1 as a projector 12, from which opening the sheets or cards 5 are introduced into the carrier case 1.

Figure 4:
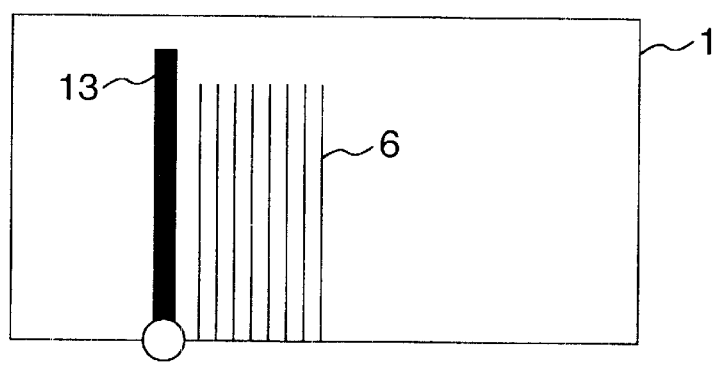
FIG. 4 schematically shows the carrier case in the present invention, with sheets or the like provided in the carrier case.

FIG. 4 shows a state wherein paper sheets or cards 6 each having the radio frequency data carrier 4 attached thereto or watermarked therein are placed in the carrier case 1 in such a state as shown in FIG. 3. The paper sheets or cards 6 come into contact with each other and also come into contact even with the divider/rotary plate 13. For the purpose of clear viewing of the drawing, the paper sheets or cards are illustrated as if they were not contacted with each other.

Figure 5:
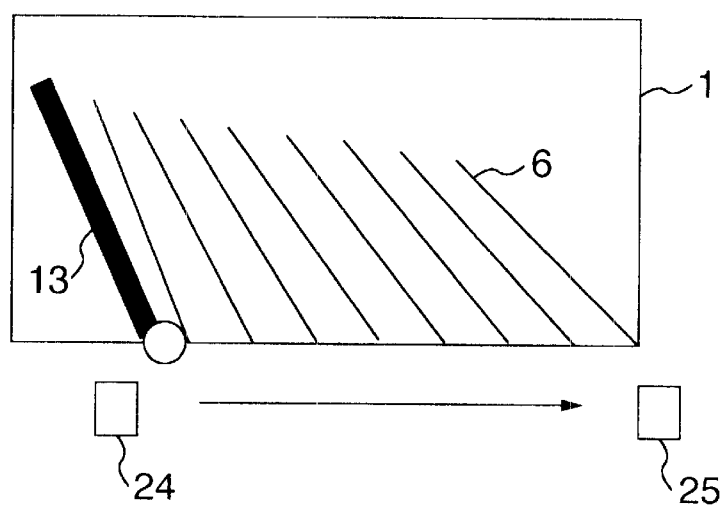
FIG. 5 schematically shows the carrier case of the present invention, also showing a state from data read start to its end.

FIG. 5 shows a state of the carrier case 1 as shown in FIG. 4, but after the cards 6 having the radio frequency data carrier 4 attached thereto or watermarked therein are set in the carrier case, the divider/rotary plate 13 is tilted at an arbitrary angle at the time of starting reading data from the cards, the device for reading out information written in the data storage of the radio frequency data carrier 4 therefrom is moved from a read start position 24 to a read end position 25, and then the reading of the information stored in the radio frequency data carrier 4 is completed. The reading sensitivity is made high by attaching the radio frequency data carrier 4 to on a side of each of the paper sheets or cards 6 provided with the reading device 2.

Figure 6:
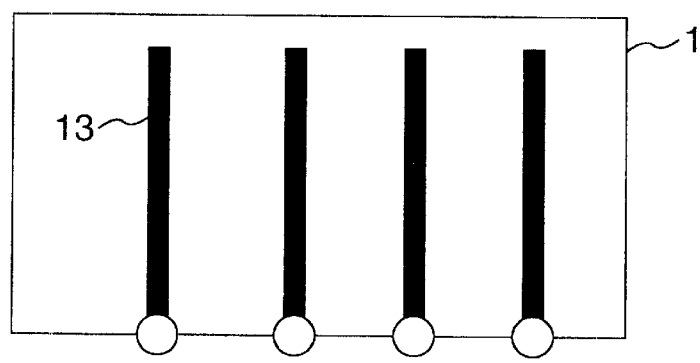
FIG. 6 schematically shows a carrier case of the present invention, with sheets or the like not provided in the carrier case.

FIG. 6 shows a carrier case 1 having divider plate/rotary plates tilted at an arbitrary angle therein.

Figure 7:
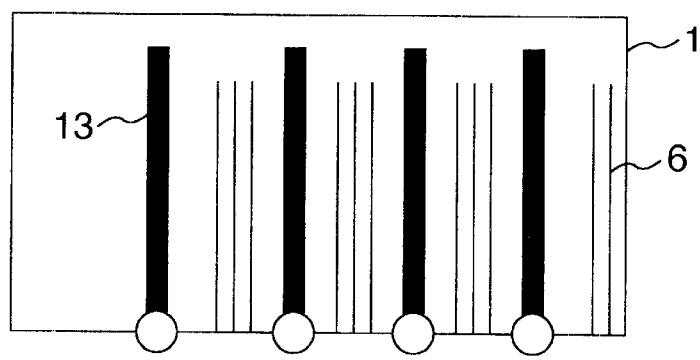
FIG. 7 schematically shows the carrier case of the present invention, with sheets or the like provided in the carrier case.

FIG. 7 shows the carrier case 1 as shown in FIG. 6, but when paper sheets or cards 6 having the radio frequency data carrier 4 attached thereto or watermarked therein are set in the carrier case.

Figure 8:
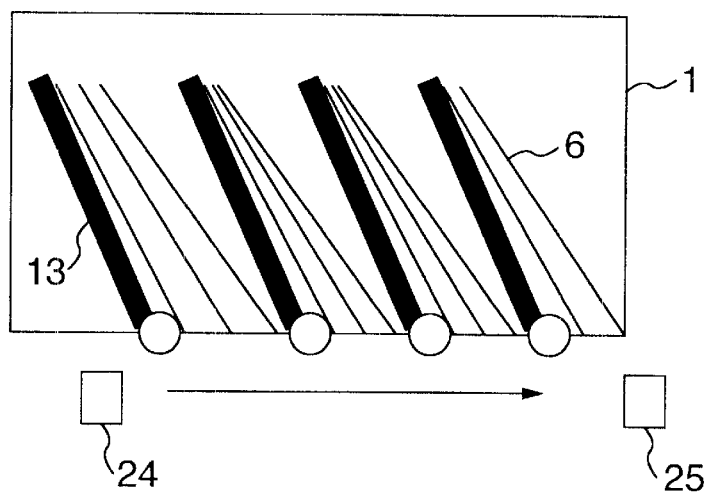
FIG. 8 schematically shows the carrier case, also showing a state from a data read start to its end.

FIG. 8 shows the carrier case 1 as shown in FIG. 7, but after paper sheets or cards 6 having the radio frequency data carrier 4 attached thereto or watermarked therein are set in the carrier case 1, the divider/rotary plates 13 are tilted at an arbitrary angle at the time of starting reading it, the device 2 for reading out information written in the data storages of the radio frequency data carriers 4 is moved from a read start position 24 to a read end position 25, and then the reading of the information stored in the radio frequency data carriers 4 is completed.

Figure 9:
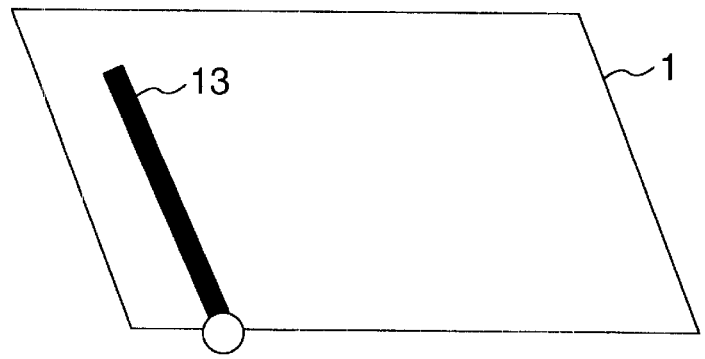
FIG. 9 schematically shows a carrier case of the present invention, with sheets or the like not provided in the carrier case.

FIG. 9 shows a carrier case 1 having a divider plate 13 tilted at an arbitrary angle therein. In this example, the carrier case 1 per se is tilted. Paper sheets or the like are brought into contact with the divider plate. Since the paper sheets are tilted at an arbitrary angle with respect to a direction perpendicular to a movement direction (refer to FIG. 11) of a reading device 2, the reading device 2 can read out information at a read end position 25 from the radio frequency data carriers 4 attached to or watermarked in the paper sheets with a good sensitivity.

Figure 10:
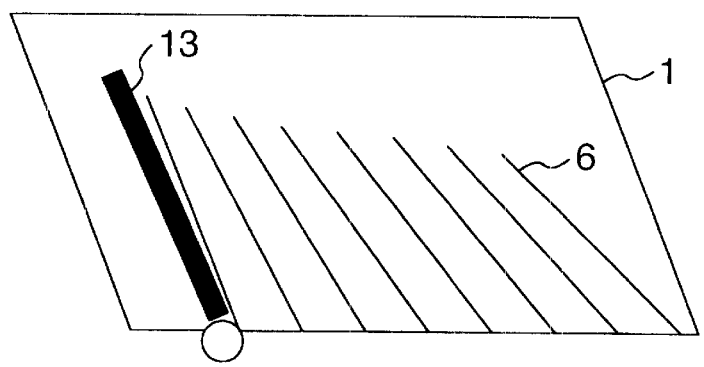
FIG. 10 schematically shows the carrier case of the present invention, with sheets or the like provided in the carrier case.

FIG. 10 shows a state of the carrier case 1 as shown in FIG. 9, but when paper sheets or cards 6 having the radio frequency data carrier 4 attached thereto or watermarked therein are set in the carrier case.

Figure 11:
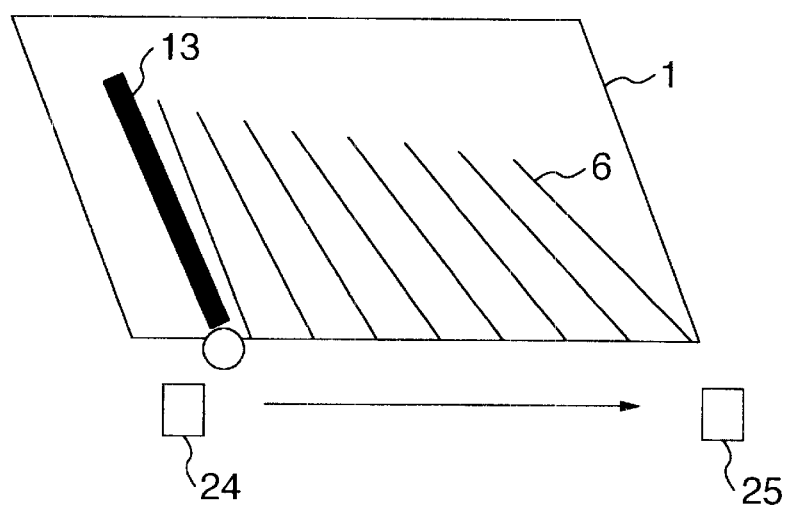
FIG. 11 schematically shows the carrier case of the present invention, also showing a state from data read start to its end.

FIG. 11 shows a state of the carrier case 1 as shown in FIG. 10, but after paper sheets or cards 6 having radio frequency data carriers 4 attached thereto or watermarked therein are set in the carrier case, a device 2 for reading out information written in data storages of the radio frequency data carriers 4 therefrom is moved from a read start position 24 to a read end position 25, and then the reading of the information stored in the radio frequency data carriers 4 is completed.

Figure 12:
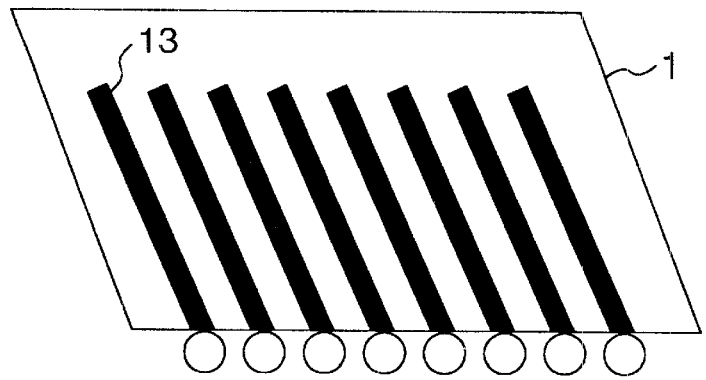
FIG. 12 schematically shows a carrier case of the present invention, with sheets or the like not provided in the carrier case.

FIG. 12 shows a carrier case 1 having a divider plate 13 capable of being tilted at an arbitrary angle therein.

Figure 13:
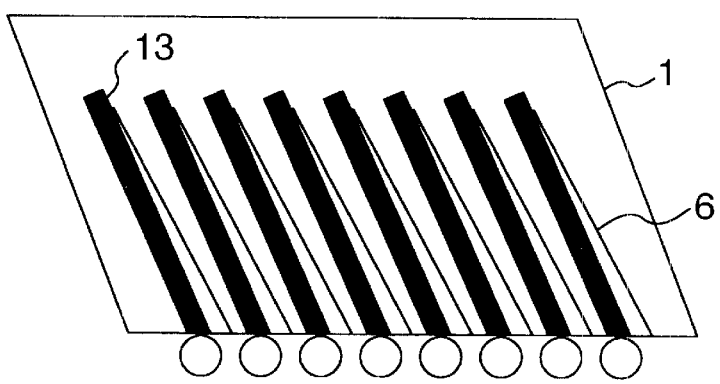
FIG. 13 schematically shows a carrier case of the present invention, sheets or the like provided in the carrier case.

FIG. 13 shows a state of the carrier case 1 as shown in FIG. 12, but when paper sheets or cards 6 having the radio frequency data carriers 4 attached thereto or watermarked therein are set in the carrier case.

Figure 14:
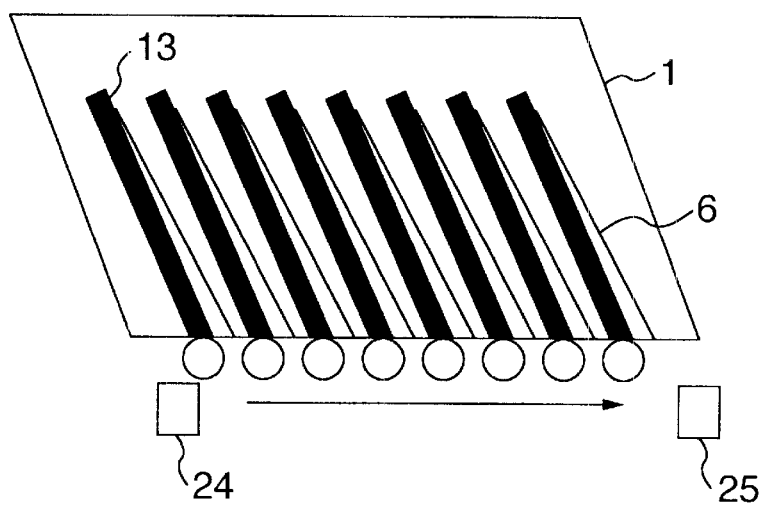
FIG. 14 schematically shows the carrier case of the present invention, showing a state from data read start to its end.

FIG. 14 shows a state of the carrier case 1 in such a state of FIG. 13, but after paper sheets or cards 6 having radio frequency data carriers 4 attached thereto or watermarked therein are set in the carrier case, a device for reading out information written in data storages of the radio frequency data carriers 4 therefrom is moved from a read start position 24 to a read end position 25, and then the reading of the information stored in the radio frequency data carriers 4 is completed.

Figure 15:
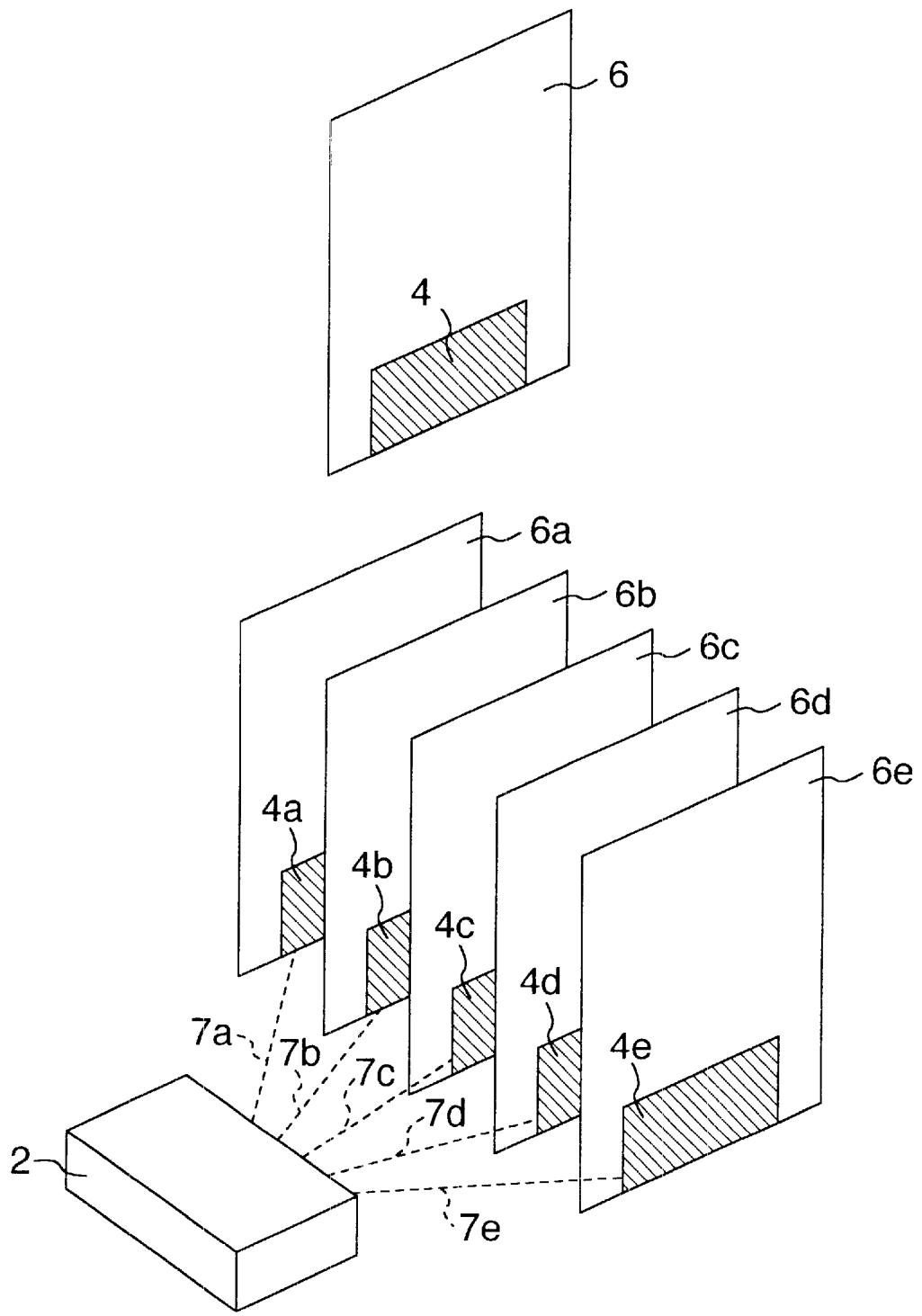
FIG. 15 shows an embodiment of the data carrier system of the present invention including devices for reading out a radio frequency data carrier and the data carrier.

FIG. 15 shows a data carrier reading system for reading data from a plurality of objects 6a, 6b, 6c, 6d and 6e having data carriers 4a, 4b, 4c, 4d and 4e previously attached thereto by means of a data reading device 2. Reference numerals 7a to 7e denote transmission lines between the radio frequency data carriers 4 and reading device 2.

Identifiers for objects having the respective radio frequency data carriers 4 attached thereto are previously stored in the radio frequency data carriers 4 and the radio frequency data carriers 4 are provided with transmitters for transmitting the identifiers, so that the data reading device 2 can read out the identifiers. The identifiers may be, for example, consecutive numbers. As shown in FIG. 1, the data reading device 2, which has the reader 21, the data storage 22 and the communication part 23, stores the read-out identifiers in the data storage 22. The communication part connects a personal computer 3 via a network or the like to transmit the read-out identifiers thereto. The personal computer 3 manages the read-out identifiers as to whether to have surely been read out for each identifier. When a plurality of such data reading devices 2 are provided, the personal computer can manage which one of reading devices has read out data. When the objects are such parcels as circulated, the circulation paths of the objects can be managed based on their identifiers.

When the present invention is applied to operations of such postal matters to be registered as registered letters or the like in postal operations, such operations are usually carried out in such a small room as a special room in a postal office. For this reason, it is difficult for this purpose to install a large-scale machine or apparatus such as a postal matter sorting machine in the small room. A small-scale machine or apparatus described in the present invention can be installed in the small room.

Figure 17:
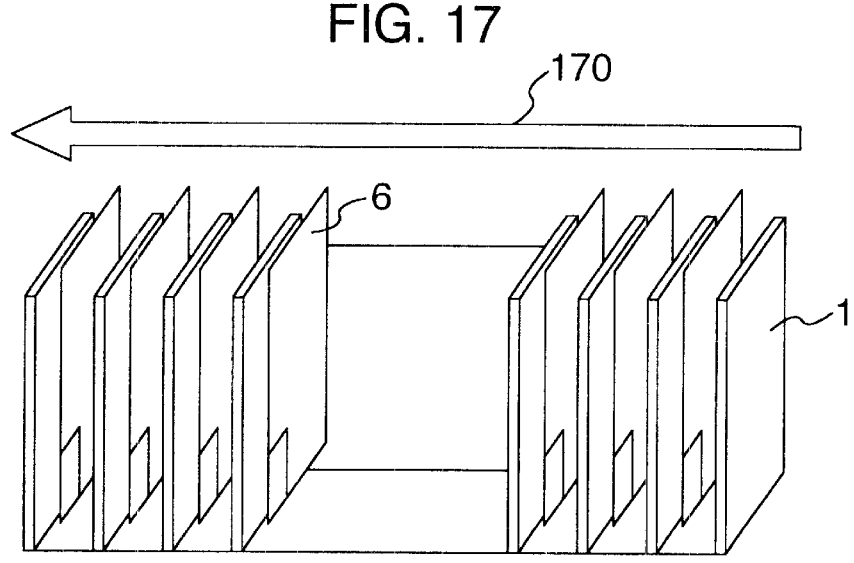
FIG. 17 shows an embodiment of the present invention including a movable carrier case and a device for reading out data from a data carrier.

FIG. 16 is a diagram when radio frequency data carriers 4 and a data reading device 2 are viewed from a top side. A carrier case is provided in its one side with an opening groove 14 and the data reading device 2 is moved in a direction along the array direction of the radio frequency data carriers 4 of paper sheets 6 arranged. The data reading device 2 may be brought into contact with the radio frequency data carriers 4 or be moved in a non-contacted manner therewith. Although the data reading device has been moved in this embodiment, the carrier case may be moved in place of the data reading device. FIG. 17 shows an example wherein an exclusive carrier case 1 is moved in a direction shown by an arrow 170. In this example, registered letters 6 having radio frequency data carriers (RFID) 4 attached thereto or watermarked therein are set in the exclusive carrier case 1.

The carrier case 1 is moved above a device 2 for reading out information written in the data storages of the radio frequency data carriers 4 in a direction parallel thereto to accurately read out data from the radio frequency data carriers 4, to count the number of registered letters and to collate it with a predetermined number to check whether the predetermined number of letters have been read out.

The present invention can advantageously read out data from data carriers accurately, count the number of paper sheets or cards 6 having the radio frequency data carriers 4 attached thereto or watermarked therein, and collate it with a predetermined value, while eliminating the need for externally removing the cards 6 from the carrier case.

What is claimed is:

1. A carrier case for accommodating objects having data carriers attached thereto, wherein an opening is provided in the carrier case for insertion of a device for reading out data stored in the data carriers, one divider plate or a plurality of divider plates for distributing the objects are provided within the carrier case, and a mechanism is provided for setting the divider plate or divider plates to be vertical at the time of inserting the objects into the carrier case to insert the objects thereinto and for setting the divider plate or divider plates to be oblique at the time of reading out data of the data carriers.

2. A carrier case for accommodating objects having data carriers attached thereto, wherein an opening is provided in the carrier case for insertion of a device for reading out data written in the data carriers, the carrier case and at least one divider plate which is provided in the carrier case are tilted at an arbitrary angle, and the device is movable for reading out information of the data carriers with the objects tilted.

3. A method for reading data carrier information, comprising the steps of providing one or a plurality of divider plates for distributing objects having data carriers attached thereto in a carrier case for accommodation of the objects, setting the divider plate or plates to be vertical to support the objects in the carrier case at the time of inserting the objects in the carrier case, inserting the objects in the carrier case, and setting the divider plate or plates to be oblique when a data reading device reads out the data carriers.

4. An accommodation device for accommodating objects having data carriers attached thereto, wherein a device is provided for reading out data stored in the data carriers, the accommodation device and at least one divider plate which is provided in the accommodation device are tilted at an arbitrary angle, and the data reading device is movable for reading out information of the data carriers of the objects when the objects are accommodated in the accommodation device in a tilted position.

* * * * *